US011062172B2

(12) United States Patent
Takeda et al.

(10) Patent No.: US 11,062,172 B2
(45) Date of Patent: Jul. 13, 2021

(54) INSPECTION APPARATUS AND INSPECTION METHOD

(71) Applicant: NuFlare Technology, Inc., Yokohama (JP)

(72) Inventors: Masaya Takeda, Yokohama (JP); Eiji Matsumoto, Yokohama (JP)

(73) Assignee: NuFlare Technology, Inc., Yokohama (JP)

( * ) Notice: Subject to any disclaimer, the term of this patent is extended or adjusted under 35 U.S.C. 154(b) by 48 days.

(21) Appl. No.: 16/710,162

(22) Filed: Dec. 11, 2019

(65) Prior Publication Data

US 2020/0250467 A1 Aug. 6, 2020

(30) Foreign Application Priority Data

Jan. 31, 2019 (JP) ............................ JP2019-015460

(51) Int. Cl.
*G06K 9/62* (2006.01)
*G06K 9/32* (2006.01)

(52) U.S. Cl.
CPC ............ *G06K 9/6206* (2013.01); *G06K 9/32* (2013.01)

(58) Field of Classification Search
CPC ..... A61B 3/066; A61B 3/0025; A61B 3/0033; A61B 3/0041; G06T 5/009; G06T 11/001; G06T 2200/24; G06T 2207/10024; G06T 2207/20208
See application file for complete search history.

(56) References Cited

U.S. PATENT DOCUMENTS 6,133,943 A * 10/2000 Needham .............. G06T 3/4038 348/37
2010/0245571 A1* 9/2010 DeVoe .............. H04N 5/23238 348/145

FOREIGN PATENT DOCUMENTS

JP 2006-267250 A 10/2006
JP 2010-286500 A 12/2010

* cited by examiner

*Primary Examiner* — David F Dunphy
(74) *Attorney, Agent, or Firm* — Oblon, McClelland, Maier & Neustadt, L.L.P.

(57) ABSTRACT

An inspection apparatus according to an embodiment includes: an optical image acquisition circuitry virtually dividing a sample into strip-shaped stripes, and acquiring an optical image; a reference image generation circuitry generating a reference image corresponding to the optical image; a comparison circuitry comparing the optical image and the reference image; a shift amount determination circuitry determining a shift amount between the optical image and the reference image, and generating an evaluation value; and an offset value calculation circuitry determining usage of the shift amount, and calculating an offset value for adjusting an acquisition position of the optical image. In a case where the offset value is calculated, the optical image acquisition circuitry acquires the optical image based on the offset value.

18 Claims, 9 Drawing Sheets

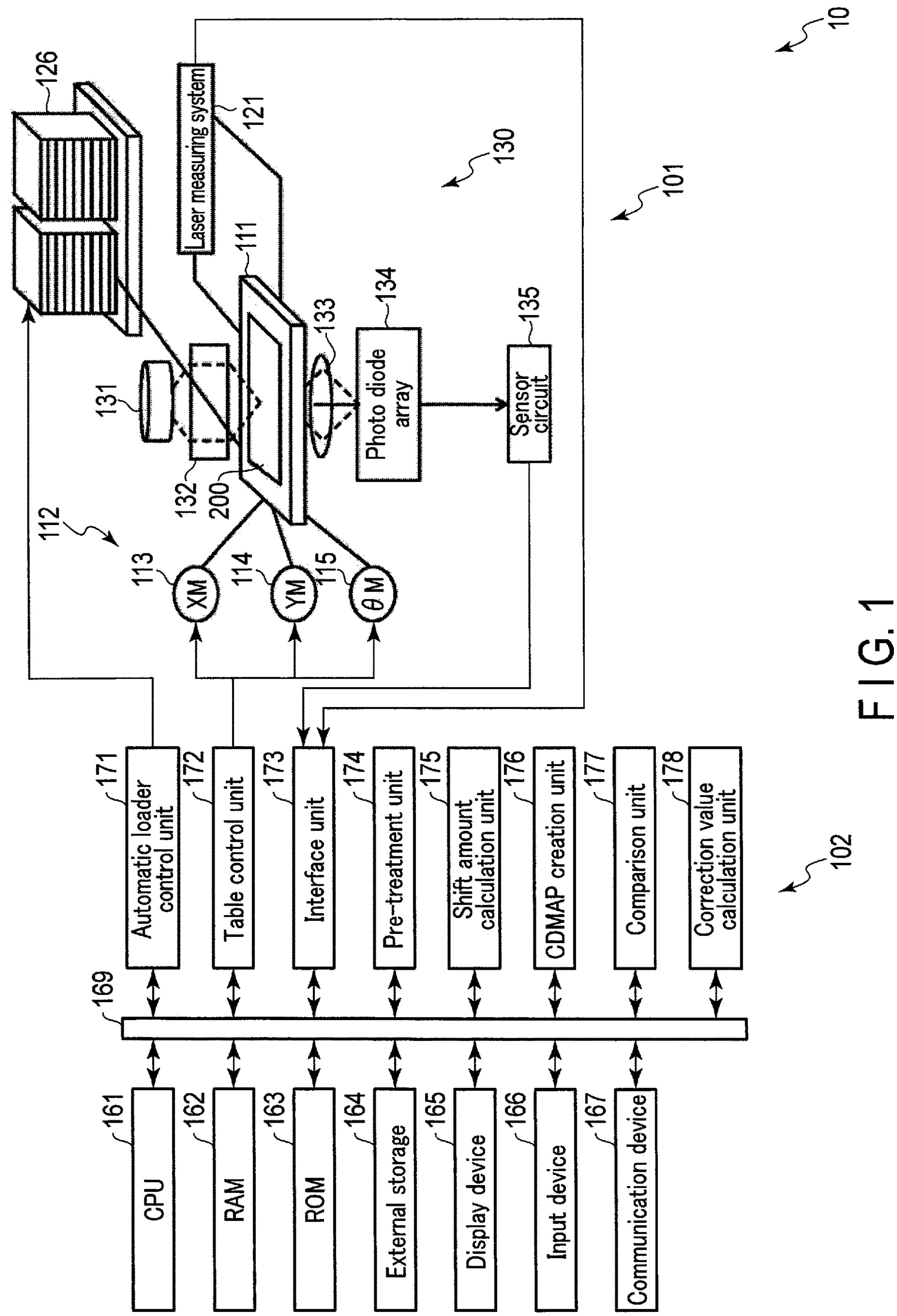
F I G. 1

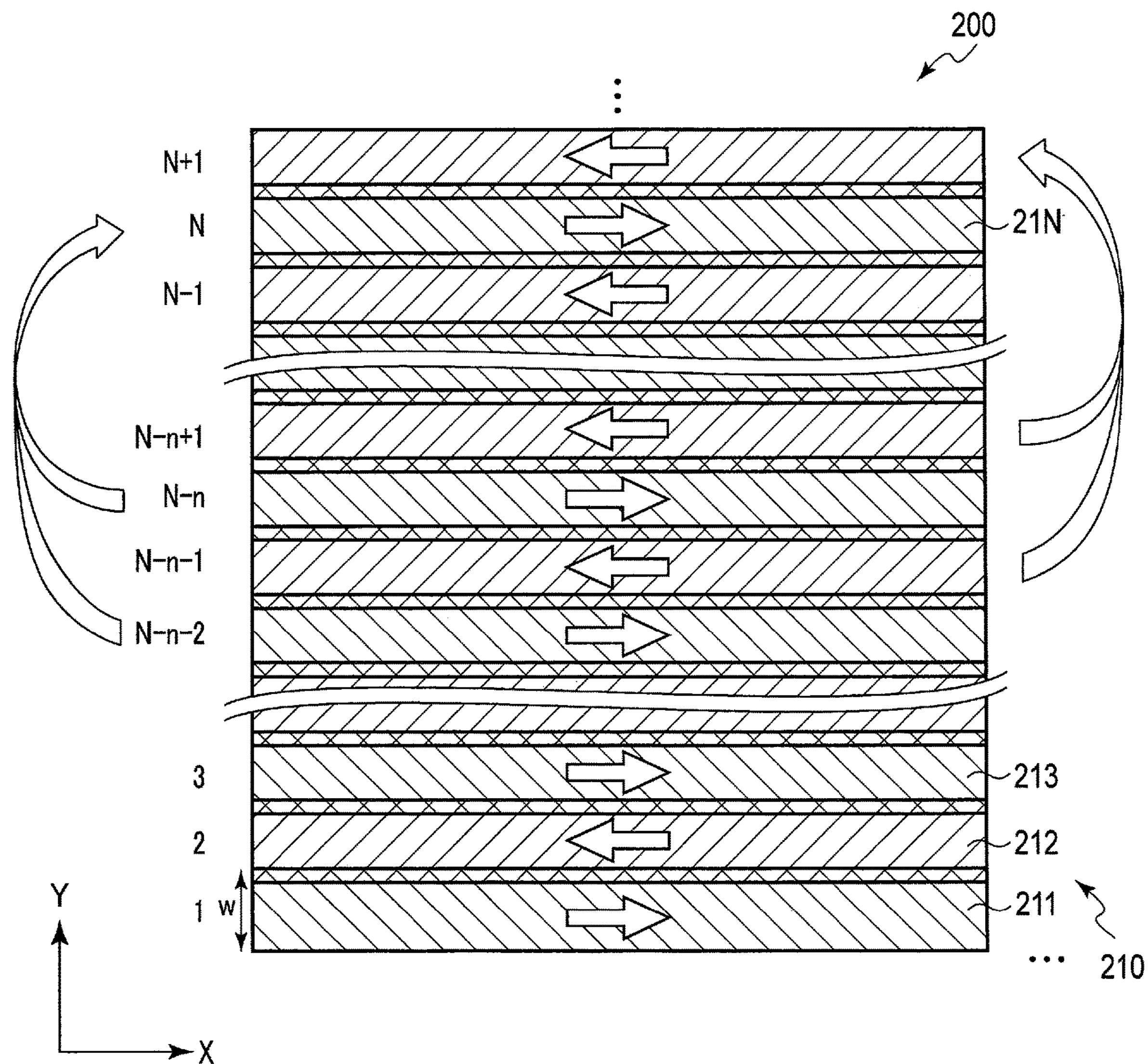
F I G. 2

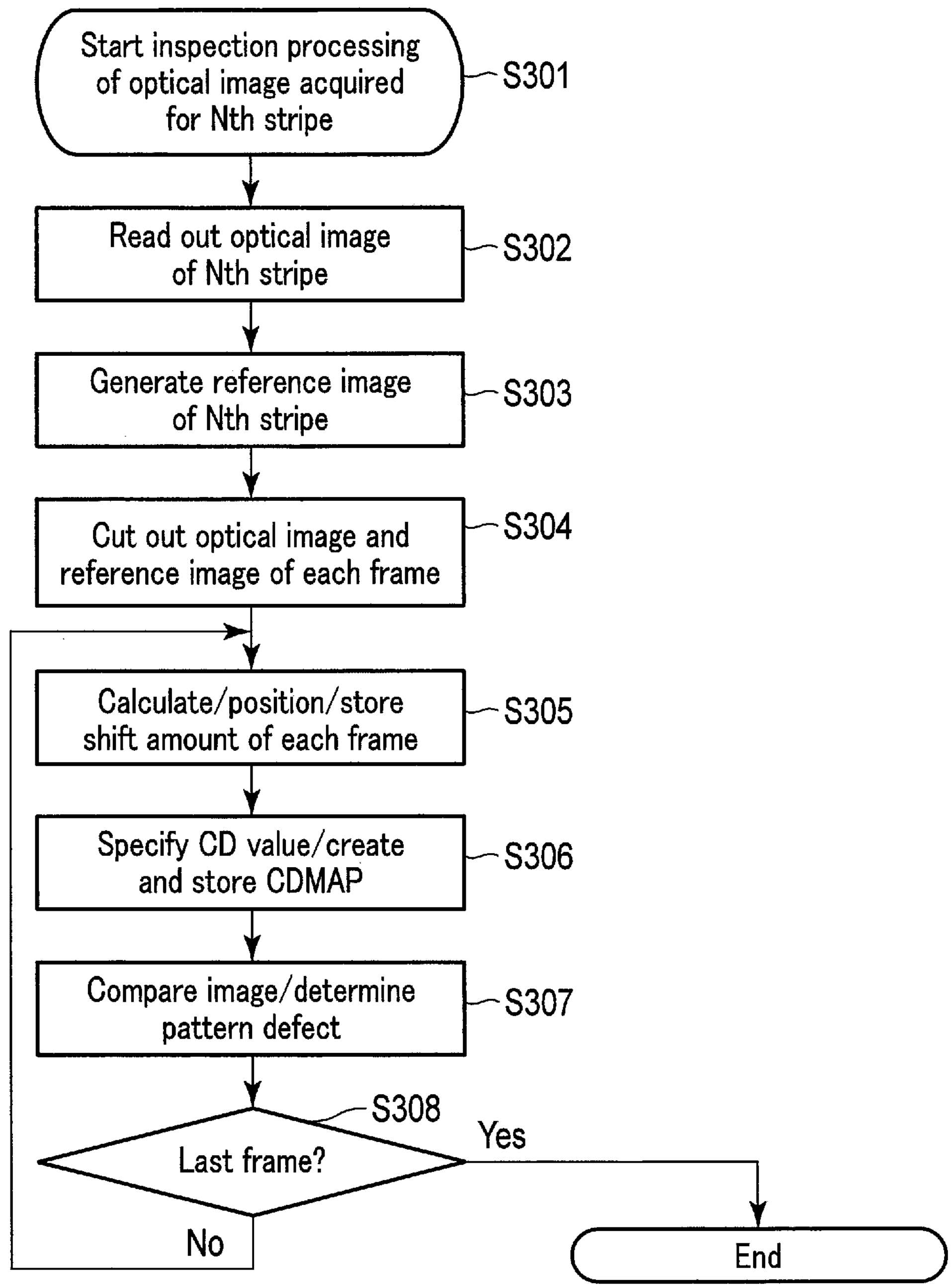
F I G. 5

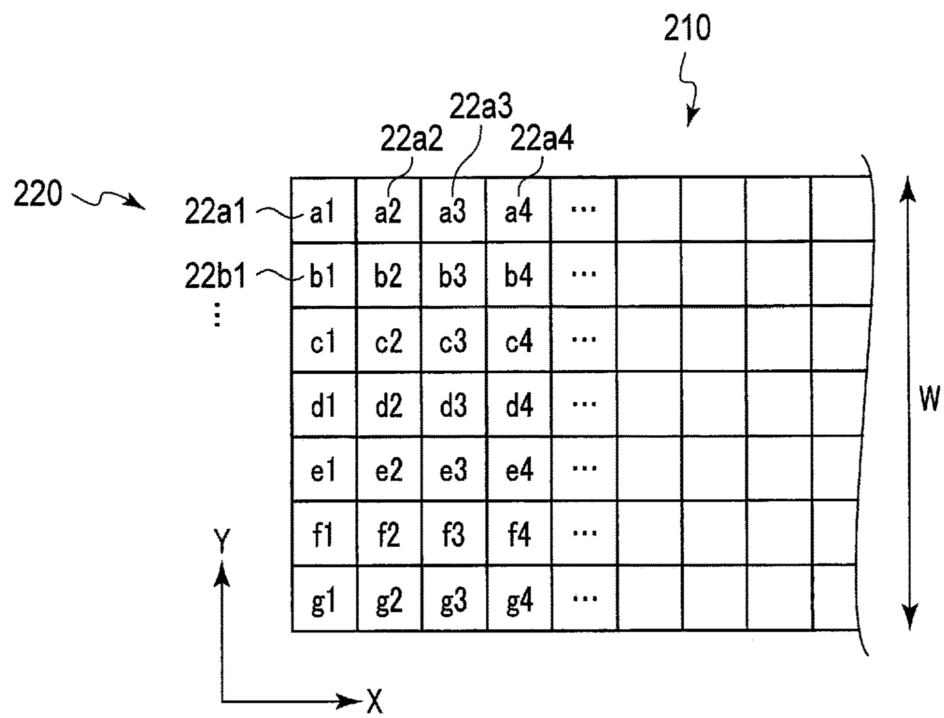
F I G. 6
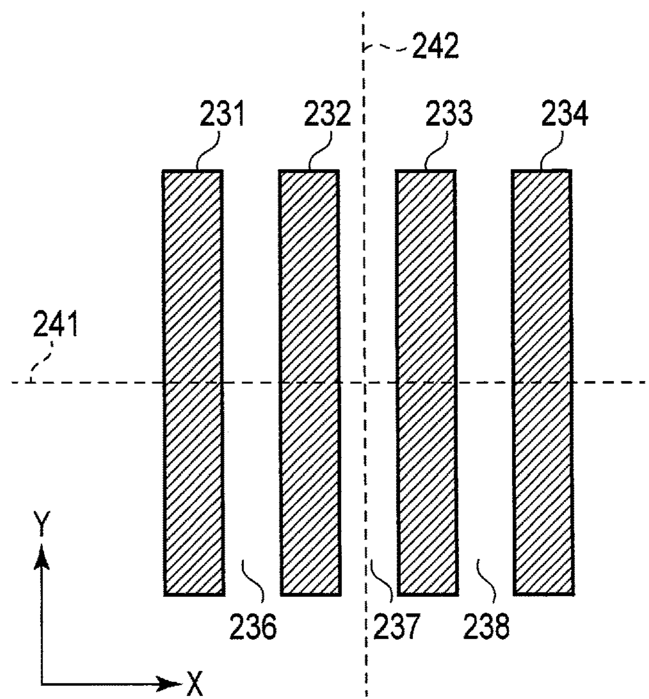
F I G. 7A

INSPECTION APPARATUS AND INSPECTION METHOD

CROSS-REFERENCE TO RELATED APPLICATIONS

This application is based upon and claims the benefit of priority from Japanese Patent Application No. 2019-015460, filed Jan. 31, 2019, the entire contents of which are incorporated herein by reference.

FIELD

The present invention relates generally to an inspection apparatus and an inspection method for inspecting a pattern formed on a sample.

BACKGROUND

When manufacturing a semiconductor element, an original pattern referred to as a mask on which a circuit pattern is formed is used to form a circuit by exposing and transferring the pattern on a wafer by a reduced projection exposure device, which is referred to as a so-called stepper.

The size of a pattern of a large-scale integrated circuit (LSI) represented by a large capacity memory or a high-performance micro-processor is nowadays ordered in single-digit nanometers (nm). As a significant cause of reduction in the production yield when manufacturing such LSI, a defect of a mask used when exposing and transferring an ultrafine pattern on a semiconductor wafer by a photolithographic technique may be considered.

Therefore, an inspection apparatus highly accurate on inspecting a defect of an ultrafine pattern formed on a mask has been desired. When inspecting a defect of a pattern on a mask, first, for example, the mask is illuminated by a light, etc., and an optical image of the pattern is acquired from the light reflected from the mask or from the light transmitted through the mask. The inspection is performed by comparing the acquired optical image of the pattern with a reference image generated from design data of the pattern. Alternatively, since the optical image of the pattern is repeatedly acquired for each semiconductor element (die) formed on a wafer, the defect inspection may also be performed by comparing the acquired images for each die. Therefore, the reference image not only includes an optical image of a pattern generated from the design data, but also includes an optical image of a pattern acquired for a certain die. Such defect inspection needs to be done efficiently in a short time with respect to an area of the mask. Such inspection apparatus can be applied not only when inspecting a pattern on a mask, but also when inspecting patterns of other inspection target samples such as a pattern formed on a semiconductor wafer, or a pattern on a substrate used for a liquid-crystal display device, etc.

Such inspection apparatus includes a table on which a sample to be inspected is placed, and which is movable within a horizontal plane, in order to acquire an optical image of a pattern across the entire area of the sample.

In order to compare the acquired optical image of the pattern and the reference image, it is necessary to match positions of both images. If the sample is placed precisely on the table, and the table is moved precisely, a position of the acquired optical image of the pattern within the sample can be determined based on the position of the table. Therefore, the position can be matched with the corresponding reference image. However, depending on the change in heat and air flow produced inside the inspection apparatus, or the change in temperature caused by opening/closing the chamber in which the table is installed when placing the sample on the table, etc., the light path of an illumination light may be changed by the fluctuation in air, or the table or the sample placed on the table may be deformed. For example, although there is a certain flow of air inside the chamber, in some cases, an illumination optical system for illuminating the sample may disturb the flow of wind blown on the sample. Since a relative positional relationship between the sample and the illumination optical system changes depending on the inspection, the place on which the wind does not blow may also change for the sample. Accordingly, the change in the temperature distribution of the sample causes the table and the sample to expand and contract or to deform. Due to such influence, the position of the optical image of the pattern determined based on the position of the table may be shifted from the actual pattern position. Therefore, if based only on the determined position, a positional shift may occur between the acquired optical image of the pattern and the pattern of the reference image to be compared to. This is called a drift of the inspection image position. The drift of the inspection image position occurs rather slowly, and not precipitously.

The drift of the inspection image position can be corrected by, for example, matching the pattern in the acquired optical image and the pattern of the reference image, and using the position of the pattern of the reference image.

As an example of such correction, for example, Japanese patent publication No. 2006-267250 and Japanese patent publication No. 2010-286500 disclose dividing an acquired optical image of a mask pattern into a plurality of frames (or areas), and matching a pattern of the acquired optical image and a pattern of a reference image for each frame to match positions of both images. In this frame matching, when a drift amount of an image position increases, a calculation amount for the matching increases, which increases the calculation time. Therefore, a frame is cut out from a subsequent pattern image by performing shifting by a drift amount acquired upon matching adjacent frames (Japanese patent publication No. 2006-267250), or frames are matched by shifting the relative positional relationship between an acquired optical image and a reference image in advance by a drift amount obtained as a result of the previously performed matching (Japanese patent publication No. 2010-286500).

However, there is a possibility that the drift of the inspection image position may gradually increase. When attempting to resolve the influence of such drift by the correction in the above-mentioned image matching, there is a possibility that a correction value may gradually increase.

In the case of reducing the influence of the above-mentioned drift by adjusting the relative positional relationship between the optical image and the reference image for each frame, the load and time of processing for matching each frame may be reduced. However, in the case where the drift amount of the original optical image from which the optical image of each frame is cut out increases, the load and time required for performing matching for all of the frames may not be necessarily reduced.

Furthermore, as mentioned above, the pattern of the sample is an extremely fine pattern. For example, when considering an example of a line-and-space in which lines are repeatedly extended in the same direction, a line pitch amount is extremely small. In the case of matching an optical image and a reference image of this line-and-space pattern, when the shift amount between both images is greater than the line pitch, there is a possibility that the line of the optical image may be matched and positioned with an adjacent line shifted a pitch away from a line where it originally should have corresponded in the reference image.

SUMMARY

The purpose of the present invention is to provide an inspection apparatus and an inspection method that are capable of performing matching between an optical image and a reference image of a sample accurately and rapidly by using an appropriate offset value to adjust a position for acquiring an optical image of a sample to be inspected, and to acquire an optical image from which an influence of a drift has been reduced.

The inspection apparatus according to an embodiment of the present invention includes: an optical image acquisition circuitry configured to virtually divide a sample into a plurality of strip-shaped stripes along a first direction, and acquire an optical image for each of the stripes; a reference image generation circuitry configured to generate a reference image corresponding to the optical image; a comparison circuitry configured to compare the optical image and the reference image corresponding to the optical image; a shift amount determination circuitry configured to determine a shift amount between the optical image and the reference image corresponding to the optical image by matching them, and generate an evaluation value indicating reliability of the shift amount; and an offset value calculation circuitry configured to determine whether or not to use the shift amount based on the evaluation value, and, in a case where the shift amount is determined to be used, calculate an offset value for adjusting an acquisition position of the optical image of the stripe based on the shift amount. In the case where the offset value is calculated, the optical image acquisition circuitry is configured to acquire the optical image based on the offset value.

The inspection apparatus and the inspection method of the present invention are capable of matching the optical image and the reference image of the sample accurately and rapidly upon sample inspection.

BRIEF DESCRIPTION OF THE DRAWINGS

FIG. 1 shows a schematic configuration of an inspection apparatus according to an embodiment.

FIG. 2 schematically shows an acquisition procedure of an optical image of a mask in the inspection apparatus of the embodiment.

FIG. 5 is a flowchart showing a procedure for inspecting an acquired optical image in the inspection apparatus of the embodiment.

FIG. 6 is a schematic view for explaining a stripe and a frame.

FIG. 7A is a schematic view for explaining a relationship between a pattern formed on a mask and a gradation value.

DETAILED DESCRIPTION

Figure 3:
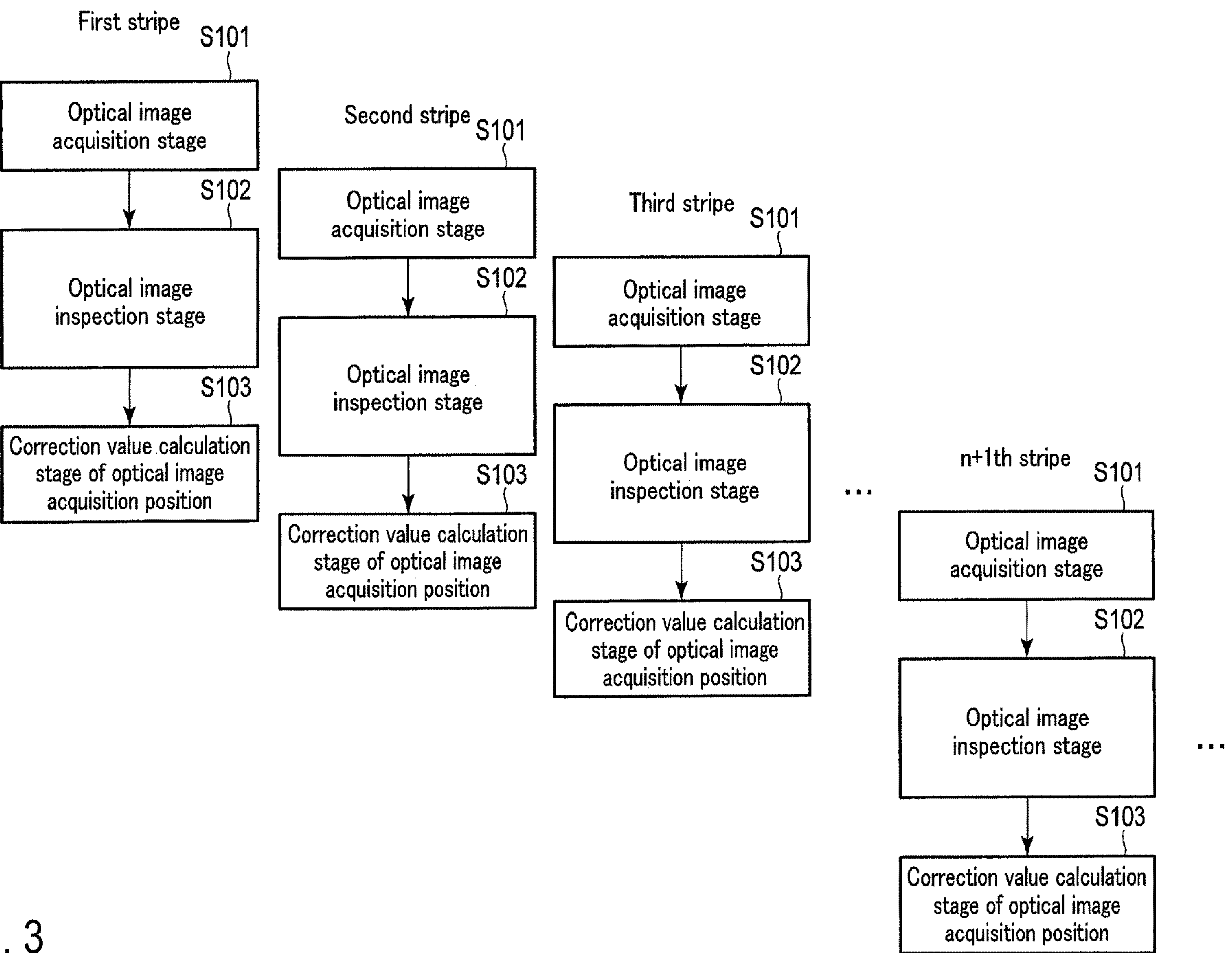
FIG. 3 is a diagram schematically showing an overview of correction processing of an optical image acquisition position in the inspection apparatus of the embodiment.

The present embodiment relates to an inspection apparatus for inspecting a pattern formed on a sample, such as a mask used for manufacturing a semiconductor element, a wafer on which the semiconductor element is formed, and a liquid-crystal substrate for a liquid-crystal display device.

As the inspection apparatus of the present embodiment, an example of an apparatus for inspecting a pattern on a mask will be explained. FIG. 1 shows a schematic configuration of an inspection apparatus 10 according to an embodiment. The inspection apparatus 10 includes an optical image acquisition device 101 and a controller device 102. The optical image acquisition device 101 acquires an optical image of a mask 200, which is a sample to be inspected. The controller device 102 controls an operation of the optical image acquisition device 101, and performs various processing regarding inspection by using the optical image acquired by the optical image acquisition device 101.

<Optical Image Acquisition Device>

The optical image acquisition device 101 includes a table 111 on which the mask 200 is placed, and a moving mechanism 112 for moving the table 111. The moving mechanism 112 includes an X-axis motor 113, a Y-axis motor 114, and a θ-axis motor 115. The X-axis motor 113 moves the table 111 in an X-axis direction on a horizontal plane. The Y-axis motor 114 moves the table 111 in a Y-axis direction on a horizontal plane orthogonal to an X-axis. The θ-axis motor 115 rotates the table 111 around a θ-axis on a horizontal plane. For example, a stepping motor may be used for these motors. The moving mechanism 112 moves the table 111 in parallel with the X-axis and in parallel with the Y-axis, or rotates the table 111 around the θ-axis. The moving mechanism 112 may further include a Z-axis motor (not shown). The Z-axis motor can move the table 111 in a Z-axis direction that is perpendicular to the X-axis and the Y-axis.

In order to acquire an optical image of the mask 200 placed on the table 111, the optical image acquisition device 101 further comprises an image acquisition unit 130 that includes a high-powered inspection optical system. The image acquisition unit 130 includes a light source 131, an illumination optical system 132, imaging optical system 133, a photo diode array 134, and a sense circuit 135.

The light source 131 is arranged, for example, above the table 111. An illumination light emitted from the light source 131 is irradiated on a predetermined position of the mask 200 on the table 111 through the illumination optical system 132. The imaging optical system 133, the photo diode array 134, and the sense circuit 135 are arranged, for example, below the mask 200. The light transmitted through the mask 200 forms an image on the photo diode array 134 through the imaging optical system 133.

A plurality of sensors are arranged on the photo diode array 134. As the sensors, for example, a time delay integration (TDI) sensor is used. A pattern image of the mask 200 formed on the photo diode array 134 is photoelectrically converted by the photo diode array 134. The electric signal generated by the photo diode array 134 is analog-to-digital (A/D) converted by the sense circuit 135. The digital signal converted by the sense circuit 135 is transmitted to the controller device 102.

While moving the table 111 continuously, the pattern of the mask 200 is imaged by the TDI sensor. In this manner, the inspection apparatus 10 is capable of acquiring an optical image in a broad range of the mask 200. The data of this optical image is, for example, eight-bit data without symbols, and expresses the brightness of each pixel by gradation.

The above-mentioned optical image acquisition device 101 has a configuration that acquires an image of a pattern from a light transmitted through the mask 200; however, may also have a configuration that acquires an image of a pattern by guiding the light reflected by the mask 200 to the photo diode array. The optical image acquisition device 101 may also have a configuration that simultaneously acquires an image of each pattern obtained by the lights transmitted and reflected through and from the mask.

The optical image acquisition device 101 further includes a laser measuring system 121, for example, in the X-axis direction and the Y-axis direction. The laser measuring system 121 measures the position of the table 111 which is moved by the moving mechanism 112. The laser measuring system 121 transmits the measured position of the table 111 to the controller device 102.

The optical image acquisition device 101 further includes an automatic loader 126. A plurality of masks 200 to be inspected are set on the automatic loader 126. The automatic loader 126 delivers the mask 200 to be inspected one by one to the table 111. The automatic loader 126 carries out the mask 200 for which imaging is ended, and carries in the next mask 200.

<Controller Device>

The controller device 102 is a computer that includes a central processing unit (CPU) 161, a random access memory (RAM) 162, a read only memory (ROM) 163, an external storage 164, a display device 165, an input device 166, and a communication device 167 that are connected to each other through a bus line 169.

The CPU 161 is a processor that controls operations of each unit of the optical image acquisition device 101, and is configured by one or a plurality of micro-processors. A part of or all of the functions of the CPU 161 may be carried out by other integrated circuits such as an application specific integrated circuit (ASIC), a field programmable gate array (FPGA), and a graphics processing unit (GPU). The RAM 162 functions as, for example, a main storage device of the CPU 161. The ROM 163 records, for example, a startup program, an operating system, and a program for controlling a circuit inside the controller device 102 for inspection, or for controlling each unit of the optical image acquisition device 101. As the external storage 164, for example, various storage devices such as a hard disk drive (HDD) and a solid state drive (SSD) may be used. The external storage 164 records various programs and parameters, etc. that are loaded on the RAM 162 and executed by the CPU 161 for the inspection processing according to the present embodiment. Furthermore, the external storage 164 records data acquired by the optical image acquisition device 101, and data regarding the inspection results processed by the controller device 102, etc. The display device 165 is a display device such as a CRT display, a liquid-crystal display, or an organic EL display. The controller device 102 may also be provided with a sound output device such as a speaker. The input device 166 is an input device such as a keyboard, a mouse, a touch panel, and a button switch. The communication device 167 is a device for connecting to a network to transmit/receive data to/from an external device. For the communication, various communication standards may be used. For example, the communication device 167 receives mask design data from the external device, and transmits data acquired by the optical image acquisition device 101 and data regarding the inspection result processed by the controller device 102, etc. to the external device.

As a program that is stored in the external storage 164 and executed by the CPU 161 for performing the inspection processing according to the present embodiment, the controller device 102 comprises an automatic loader control unit (circuitry) 171, a table control unit (circuitry) 172, an interface (I/F) unit (circuitry) 173, a pre-treatment unit (circuitry) 174, a shift amount calculation unit (circuitry) 175, a CDMAP creation unit (circuitry) 176, a comparison unit (circuitry) 177, and a correction value calculation unit (circuitry) 178.

The automatic loader control unit 171 controls the operation of the automatic loader 126 under the control of the CPU 161. The automatic loader control unit 171 operates the automatic loader 126 to have the mask 200 to be inspected delivered to the table 111. The automatic loader control unit 171 also operates the automatic loader 126 to have the mask 200 carried out from the table 111.

The table control unit 172 controls the operation of the moving mechanism 112 under the control of the CPU 161, and performs control to move the table 111 to a predetermined position. Here, the table control unit 172 acquires the position measurement result in the X-axis/Y-axis directions measured by the laser measuring system 121 via the interface unit 173. Based on the acquired measurement result, the table control unit 172 calculates the position of the mask for which an optical image is acquired by being illuminated by the illumination optical system 132. Furthermore, the table control unit 172 uses the calculation result to calculate a moving control value up to the next optical image acquisition position in the mask 200, and moves the table 111.

The interface unit 173 performs input and output processing of data between the optical image acquisition device 101 and the controller device 102. Through the interface unit 173, for example, the measurement result obtained by the above-mentioned laser measuring system 121, of the mask 200 acquired by the sense circuit 135, is input to the controller device 102. The optical image of the mask 200 is stored in the external storage 164 by being associated with the position of the table 111 of when the optical image was acquired, that is, the inspection position in the mask 200.

The pre-treatment unit 174 develops, for example, pattern design data (the mask design data) of the mask 200 recorded in the external storage 164 on image data. When doing so, the pre-treatment unit 174 performs various processing, such as applying a filter, with respect to a reference image that is based on the mask design data recorded in the external storage 164, so that it can be compared to the optical image. In this manner, the pre-treatment unit 174 functions as a reference image generating unit that generates data of a reference image that can be compared to an optical image based on the mask design data. In the present embodiment, although the reference image is generated based on the mask design data, the reference image may also be generated based on the acquired optical image of the mask in the manner mentioned above. Furthermore, as will be explained later on, the pre-treatment unit 174 also performs processing of cutting out an image divided into a plurality of frames from the acquired optical image and the reference image of the mask 200.

The shift amount calculation unit 175 calculates, for example, a Sum of Squared Difference (SSD) value of a shift amount between a pattern of the optical image acquired regarding each area prepared by the pre-treatment unit 174 and a pattern of a corresponding reference image as an evaluation index of the shift amount (or, an evaluation index of similarity). The evaluation index of the shift amount is not limited to the SSD value, and may have other values such as a Sum of Absolute Difference (SAD) value and a Normalized Cross-correlation (NCC) value used as the index. For example, while shifting an optical image of a certain frame little by little (for example, in the Y-axis direction) at predetermined intervals (for example, at intervals smaller than pixels), the shift amount calculation unit 175 performs pattern matching with respect to the reference image corresponding to the frame. The shift amount calculation unit 175 determines that the position matching is achieved (for example, in the Y-axis direction) when the evaluation index of the shift amount (for example, the SSD value) reaches a minimum. Accordingly, the shift amount calculation unit 175 determines a distance at which the optical image has been shifted until the patterns of both images have matched (corresponding to the number of times at which the intervals were shifted) as the shift amount (for example, in the Y-direction). The same applies to the X-axis direction. In the present embodiment, the shift amount for each frame of the acquired optical image can be obtained.

The CDMAP creation unit 176 calculates a critical dimension (CD) value of a pattern drawn on the mask 200 based on the optical image. For example, in the case where a line pattern is drawn on the mask 200, the CDMAP creation unit 176 detects an edge of the line based on the luminance of each pixel in the optical image of the mask 200, and calculates the distance between these edges as a line width. The CDMAP creation unit 176 then calculates a difference (dimension difference=ΔCD) between a CD value of the pattern calculated regarding the optical image of the mask 200 to be inspected and a CD value of a corresponding pattern calculated regarding the reference image to be the criteria. Based on the calculated ΔCD value, the CDMAP creation unit 176 creates a ΔCD map or a CDMAP by, for example, mapping the ΔCD value in each in-plane position of the mask 200. The created CDMAP is recorded in the external storage 164, etc.

The comparison unit 177 compares the optical image of the mask 200 and the reference image whose positions have been matched for each pixel. Based on this comparison result, the comparison unit 177 determines whether or not there is a defect in the pattern of the mask 200. As a result of the comparison, the determination result on whether or not there is a defect, etc. is stored in, for example, the external storage 164.

As will be described below, the correction value calculation unit 178 calculates a correction value which is an estimation value of the shift amount of an Nth stripe (N is an integer number equal to or larger than one) caused by a drift, etc. occurred during imaging of the mask. Upon calculation of the correction value, the correction value calculation unit 178 uses the shift amount calculated by the shift amount calculation unit 175 and reliability information obtained in the process of creating the CDMAP at the CDMAP creation unit 176. Here, the reliability information is a value indicating the reliability of the shift amount of each frame calculated by the shift amount calculation unit 175 as a true positional shift of the frame.

The automatic loader control unit 171, the table control unit 172, the interface unit 173, the pre-treatment unit 174, the shift amount calculation unit 175, the CDMAP creation unit 176, the comparison unit 177, and the correction value calculation unit 178 may be configured by a program that executes an integrated circuit such as the CPU, ASIC, FPGA, or GPU, may be configured by hardware or firmware included in these integrated circuits, or may be configured by an individual circuit that is controlled by these integrated circuits.

[Regarding Table Movement, Stripe, and Offset Value Upon Image Acquisition]

FIG. 2 shows a procedure for acquiring the optical image of the mask 200 by moving the table 111. As mentioned above, the optical image of the mask 200 is acquired while moving the table 111.

As shown in FIG. 2, the width of the range in which an imaging can be performed at once by the sense circuit 135 is a scan width W. When performing imaging from one end to the other end of the mask 200 while moving the table 111 in the X-axis direction, a strip-shaped (stripe) image can be obtained in the scan width W extending in the X-axis direction. For example, an image of a first stripe 211 shown in FIG. 2 can be obtained. Subsequently, the table 111 moves in the Y-axis direction by a distance that is slightly shorter than the scan width W. The table 111 is then moved in an opposite direction of the X-axis direction, and the optical image of the mask 200 is acquired as an optical image of a stripe 212 with a scan width W in a direction opposite to the stripe 211. The first stripe 211 and the second stripe 212 are slightly overlapped. By repeating the imaging of the pattern on the mask 200 by moving the mask 200 in a step of width W in the Y-axis direction while reciprocating in the X direction in the above manner, the optical image of the entire mask 200 can be obtained in strip shapes in the order of a third stripe 213, a fourth stripe, and so on. In this manner, a sample, such as the mask 200 to be inspected, is, for example, divided virtually into a plurality of strip-shaped stripes along the X-axis direction. The optical image is acquired for each of such stripes.

As mentioned above, sometimes, various factors, such as slight temperature variations inside the chamber where the table 111 and the mask 200 to be inspected are accommodated, may cause the position of the acquired optical image of the mask 200 to gradually drift from the targeted position of the mask 200. When attempting to resolve the influence of such drift by the correction by the above-mentioned image matching between the optical image and the reference image of each frame, a correction value may gradually increase. Therefore, a correction value estimated earlier as the shift amount of the acquired optical image of the stripe is used for the Nth stripe 21N to move the table 111 so that the position of the mask 200 for starting the acquisition of the optical image is offset. In this manner, an optical image with less drift amount can be acquired for the Nth stripe 21N.

On the other hand, although the matching between the optical image of the pattern of the mask 200 and the pattern of the reference image is performed by minimizing the evaluation index of the shift amount, such as the SSD value (or the evaluation index of similarity), the reliability of whether or not it is truly positioned would change in accordance with the shape of the pattern or the density of the pattern. Therefore, in the case where the correction value determined from a matching state where the reliability is low does not reflect a true shift, when calculating the offset value of the Nth stripe 21N based on a previous stripe correction value with low reliability, there is a possibility that the error of the position of the optical image may become rather large.

Therefore, in the case where the reliability of the shift amount obtained by the image matching is high, the inspection apparatus 10 of the present embodiment employs such shift amount for calculating the correction value. However, in the case where the reliability of the shift amount obtained by the image matching is low, such shift amount would not be used for the calculation of the correction value. As a result, since the offset value of the Nth stripe 21N is calculated from a highly reliable correction value of a previous frame, an optical image can be acquired with the influence of the drift corrected with more certainty.

In the following, processing for achieving the above-mentioned function in the inspection apparatus 10 of the present embodiment will be explained in detail.

[Overview of Operation of Inspection Apparatus]

The operation of the inspection apparatus 10 will be explained. FIG. 3 is a diagram schematically showing an overview of correction processing of an optical image acquisition position in the inspection apparatus 10. As shown in FIG. 3, the controller device 102 of the inspection apparatus 10 determines the correction value of the image acquisition position from the optical image acquired for the Nth stripe by pipeline processing that includes acquisition stage S101 of the optical image of the mask, inspection stage S102 of the acquired optical image, and calculation stage S103 of the correction value of the optical image acquisition position. The acquired correction value of the optical image acquisition position is reflected on the acquisition position of the optical image regarding a subsequent stripe.

Here, acquisition stage S101 presents processing for acquiring the optical image of the mask 200 for each stripe by performing imaging while moving the mask 200 that is placed on the table 111 by moving the table 111.

Acquisition data inspection stage S102 presents processing for inspecting the optical image obtained at the acquisition stage S101, and determining whether or not the mask 200 has a defect by calculating the shift amount, creating the CDMAP, and performing comparison processing, etc.

Image acquisition position correction value calculation stage S103 presents processing for calculating the image acquisition position correction value for controlling movement of the table 111 by using the information obtained in acquisition data analysis processing.

As shown in FIG. 3, for example, after the pipeline processing of the first stripe 211 is started, acquisition of the optical image of the mask 200 in an area corresponding to the stripe 211 in the optical image acquisition stage S101 is ended, and, when the optical image of the first stripe is stored in the external storage 164, the acquisition of the optical image of the mask 200 in an area corresponding to the next second stripe 212 is started. That is, the acquisition of the optical image of the second stripe 212 is started before the correction value of the optical image acquisition position is determined from the acquisition of the optical image of the first stripe 211. Accordingly, the acquisition of the optical image is performed rapidly across the entire area of the mask 200. FIG. 3 also shows that after the correction value of the acquisition position of the optical image is calculated from the optical image of the mask 200 acquired regarding the first stripe 211 in stage S103, the acquisition of the image data of the mask 200 is started for the (n+1)th stripe. In the actual processing, each of the processing stages S101, S102, and S103 includes some sub-stages.

<Optical Image Acquisition Stage>

Figure 4:
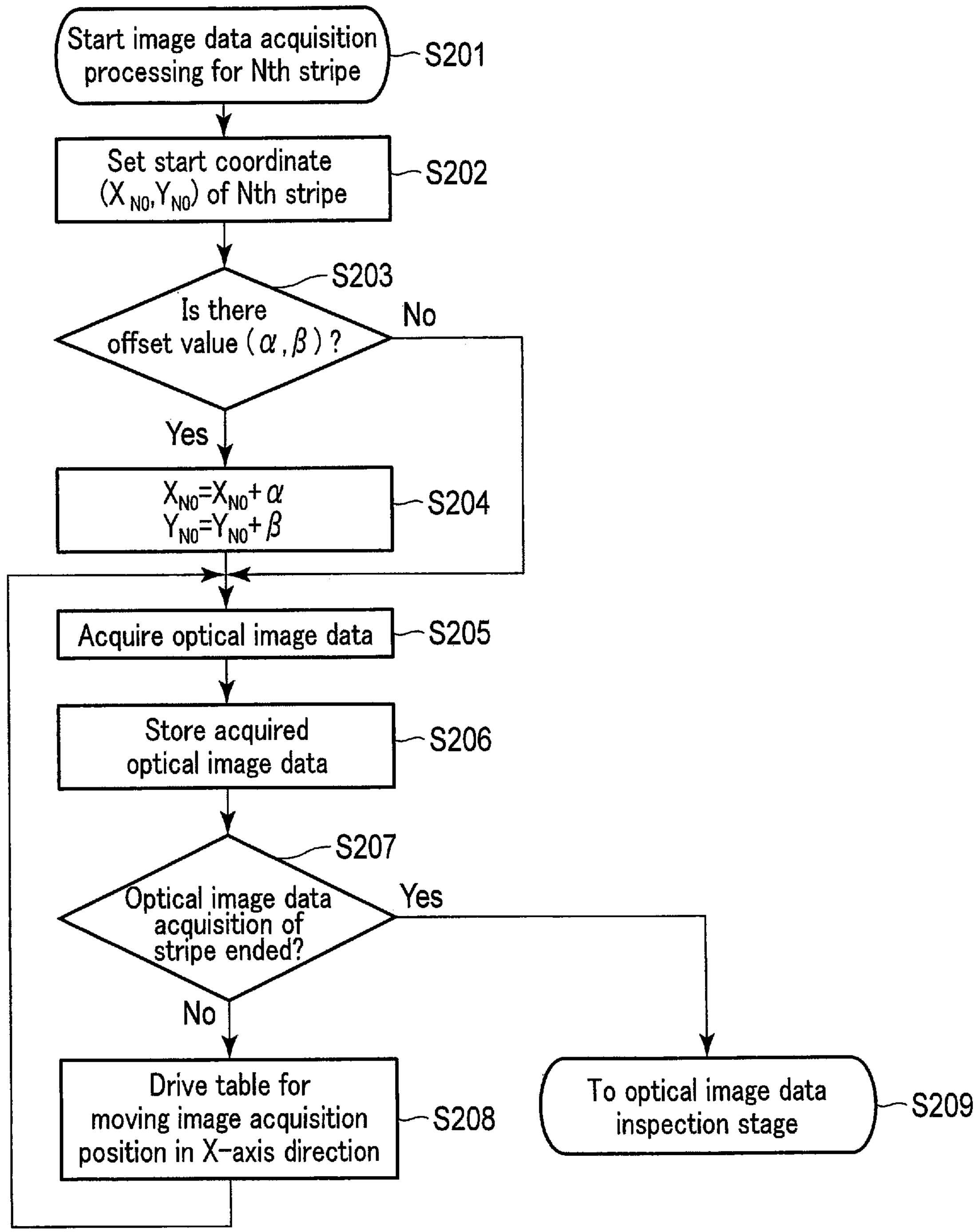
FIG. 4 is a flowchart showing a procedure for acquiring an optical image of a mask in the inspection apparatus of the embodiment.

A specific procedure of the optical image acquisition in stage S101 will be explained with reference to the flowchart shown in FIG. 4. FIG. 4 is a flowchart showing the acquisition procedure of the optical image of the mask 200 for the Nth stripe.

In step S201, the controller device 102 starts the optical image acquisition of an area of the mask 200 that corresponds to the Nth stripe 21N.

In step S202, the controller device 102 sets an acquisition start coordinate ($X_{NO}$, $Y_{NO}$) for acquiring the optical image of the stripe 21N.

Then, in step S202, the controller device 102 determines whether or not there is an offset value OFFSET (α, β) for a position to start acquiring the optical image regarding the stripe 21N. As mentioned above, the offset value is a value used for adjusting the acquisition start position of the optical image in consideration of the drift regarding a stripe for which an optical image is to be acquired (for example, the Nth stripe 21N). The calculation of the offset value OFFSET (α, β) will be explained in detail hereinafter with reference to FIG. 9. In the case where there is no offset value, the processing proceeds to step S205. On the other hand, in the case where there is an offset value OFFSET (α, β), in step S204, an optical image acquisition start coordinate ($X_{NO}$, $Y_{NO}$) of the stripe 21N is corrected by the offset value OFFSET (α, β) ($X_{NO}=X_{NO}+\alpha$, $Y_{NO}=Y_{NO}+\beta$). The processing then proceeds to S205, and the optical image acquisition of the stripe 21N starts from the corrected start coordinate.

In step S205, the table 111 is moved based on the optical image acquisition start coordinate ($X_{NO}$, $Y_{NO}$), and an area corresponding to the mask 200 is illuminated by the illumination optical system 132. Then, an optical image of the illuminated location of the mask 200 is acquired by the sense circuit 135. The acquired optical image is transmitted to the controller device 102.

In step S206, the controller device 102 stores the optical image acquired by the sense circuit 135 in, for example, the external storage 164.

In step S207, the controller device 102 determines whether or not the acquisition of the optical image is ended regarding the stripe 21N. In the case where the optical image acquisition imaging is not completed to the end of the mask 200 in the X-axis direction, the controller device 102 moves the table 111 through the table control unit 172 so that the position at which the optical image of the mask 200 is to be acquired is moved in the X-axis direction in step S208. The processing then returns to optical image acquisition step S205. On the other hand, in the case where the acquisition of the optical image of the stripe 21N is ended, the processing for the stripe 21N proceeds to optical image inspection stage S102. Therefore, the inspection apparatus 10 functions as an optical image acquisition unit for acquiring the optical image of the sample. That is, the inspection apparatus 10 includes the optical image acquisition unit (circuitry).

The optical image of the mask 200 regarding the entire area of the stripe 21N is stored in the external storage 164 at the time of proceeding to optical image inspection stage S102. For the odd-numbered stripes and the even-numbered stripes, the direction in which the mask 200 moves is reversed between a positive direction of the X-axis and a negative direction of the X-axis.

<Optical Image Inspection Stage>

FIG. 5 shows a specific processing procedure of optical image inspection stage S102 regarding the Nth stripe 21N.

In step S301, the controller device 102 starts inspection of the optical image acquired regarding an area of the mask 200 corresponding to the Nth stripe 21N. As mentioned above, the external storage 164 holds data of the optical image of the stripe 21N at the time of ending the optical image acquisition stage for the Nth stripe 21N.

In step S302, the controller device 102 reads out the optical image of the stripe 21N stored in the external storage 164.

In step S303, the controller device 102 generates a reference image based on design data of a portion corresponding to the Nth stripe 21N in the design data of the mask 200 stored in the storage 164 through the pre-treatment unit 174. The optical image obtained by the photo diode array 134 is acquired in a state where the filter is operated by the resolution characteristics of the optical system and the aperture effect of the photo diode array, etc. Therefore, in order to match the optical image and the reference image, the pre-treatment unit 174 performs the same filter processing also on the pattern data of the reference image. The reference image corresponding to the Nth stripe 21N may also be created by creating the reference image of the entire area of the mask 200 in advance based on the design data, and cutting out the reference image corresponding to the Nth stripe 21N from the reference image of the entire area. Furthermore, as mentioned above, in the case where a defect inspection is performed by comparing repeated images in the optical images acquired regarding the mask 200 (a die-to-die or a cell-to-cell comparison inspection), the reference image may be an optical image of a die or a cell that has already been acquired regarding the mask 200.

In step S304, in order to inspect the match between the acquired optical image and reference image, the pre-treatment unit 174 divides each of the optical image and the reference image corresponding to the Nth stripe 21N into a plurality of frames 220.

FIG. 6 shows an example of dividing each of the optical image and the reference image corresponding to the stripe 21N into a plurality of frames. In the example shown in FIG. 6, the image data of the stripe 21N is divided into seven frames 22*ax* to 22*gx* (x is an integer number equal to or greater than one) in the Y-axis direction. Furthermore, the image data of the stripe 21N is divided into several hundred to several thousand frames in the X-axis direction. That is, for example, frames 22*a*1, 22*a*2, 22*a*3, 22*a*4, . . . , are lined up along the X-axis. The pre-treatment unit 174 cuts out the optical image and the reference image corresponding to each frame.

In step S305, the shift amount calculation unit 175 calculates a difference of when the optical image and the reference image are superimposed (for example, the difference in the X-axis direction and the difference in the Y-axis direction) regarding each frame that is cut out in step S304, and calculates an SSD value which is the evaluation index of the shift amount. The shift amount calculation unit 175 performs the superposition while shifting the positional relationship between the optical image and the reference image by a predetermined width (for example, by a predetermined width in the X-axis direction, a predetermined width in the Y-axis direction), and repeats the calculation of the SSD value. When the SSD value is minimized, the optical image and the reference image are considered to be matched, and the amount shifted up to then (the shift amount in the X-axis direction, the shift amount in the Y-axis direction) is determined as the shift amount of each frame of the optical image.

For example, in the case where N is equal to or larger than three, when determining the shift amount of each frame in the optical image of the Nth stripe 21N, the shift amount calculation unit 175 may refer to the determined shift amount of the stripe regarding the optical image of the N−2th stripe (for example, an average of all of the frames of the optical image of the N−2th stripe). The shift amount calculation unit 175 may also start the above-mentioned image matching processing by shifting the optical image of each frame of the Nth stripe 21N by the corresponding shift amount in advance. As a result, the number of times of shifting the relative position of the optical image and the reference image until they match would be reduced, thereby allowing to shorten the calculation of the shift amount regarding each frame. The reason why the shift amount of the N−2th stripe, and not the N−1th stripe, is used is because the scanning directions in the X-axis direction of the mask 200 (the direction in which the table 111 moves) are opposite for the odd number stripes and the even-number stripes, which brings about different tendencies in the shifting. By using the shift amount of the stripes scanned in the same direction in the X-axis direction, the positional relationship between the optical image and the reference image can be adjusted more accurately. The shift amount calculation unit 175 stores the shift amount calculated regarding each frame of the optical image of the stripe 21N in the external storage 164.

In step S306, the controller device 102 calculates a CD value regarding each frame of the optical image of the Nth stripe 21N through the CDMAP creation unit 176.

A summary of calculating the CD value will be explained with reference to the FIG. 7A to FIG. 7C by giving examples of the line-and-space pattern extending in the Y-axis direction.

FIG. 7A schematically shows the optical image of the line-and-space pattern of a certain frame 220. In FIG. 7A, a case in which the frame 220 includes four lines in the Y-axis direction (first line 231, second line 232, third line 233, and fourth line 234) is shown. There are a first space 236 between the first line 231 and the second line 232, a second space 237 between the second line 232 and the third line 233, and a third space 238 between the third line 233 and the fourth line 234.

Figure 7B:
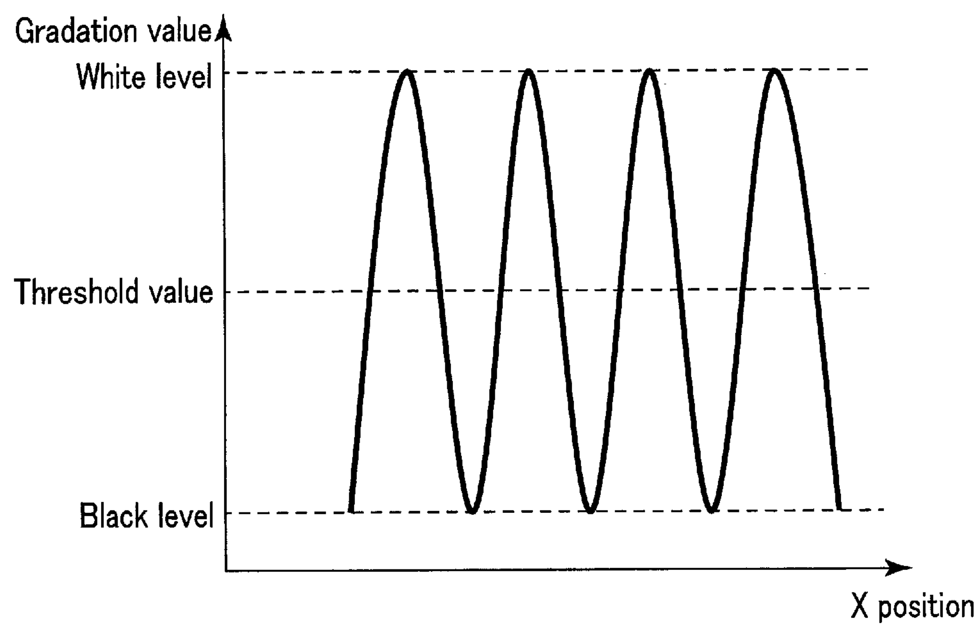
FIG. 7B is a schematic view for explaining a relationship between a pattern formed on a mask and a gradation value.

FIG. 7B schematically shows the relationship between the position in the X-axis direction and the gradation value of each pixel along a broken line 241 in the X-axis direction in FIG. 7A. In the inspection apparatus 10 that detects a light transmitted through the mask 200 by the photo diode array 134 as shown in FIG. 1, a portion corresponding to the line shows a high gradation value (a white level), and a portion corresponding to a space shows a low gradation value (a black level). As shown in FIG. 7A, since there are four lines, there are four heap portions where the gradation value is high. In the inspection apparatus 10 that detects the light reflecting the mask 200 by the photo diode array 134, the relationship of the gradation value is reversed.

Figure 7C:
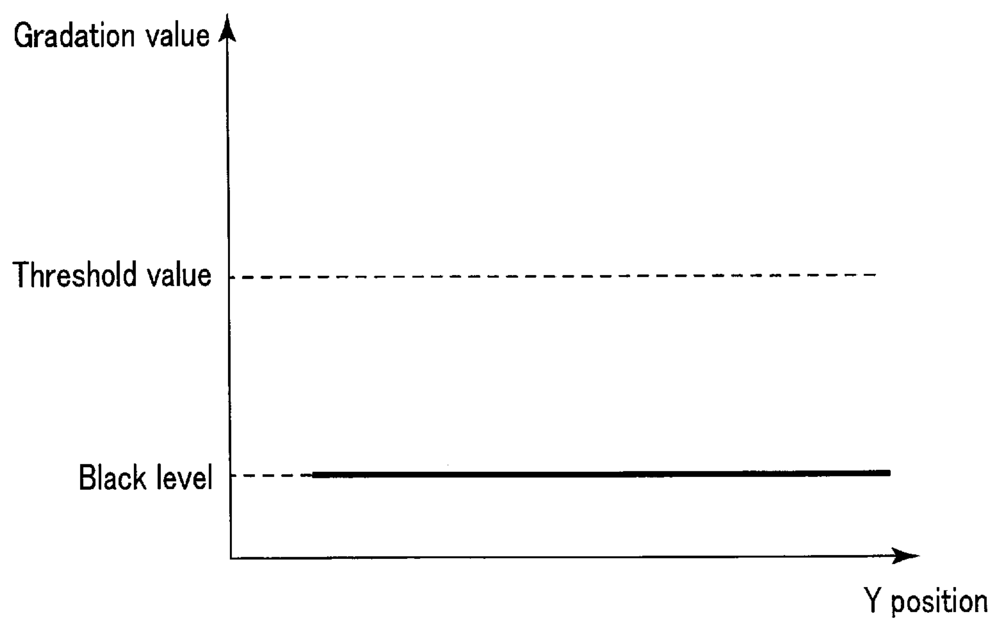
FIG. 7C is a schematic view for explaining a relationship between a pattern formed on a mask and a gradation value.

FIG. 7C schematically shows the relationship between the position in the Y-axis direction and the gradation value at a position in the second space 237 along a broken line 242 in the Y-axis direction in FIG. 7A. Since a line pattern does not exist along the broken line 242, a low gradation value (black level) is shown regardless of the position in the Y-axis direction.

The CD value is calculated, for example, in the following manner. As shown in FIG. 7B and FIG. 7C, in order to detect the edge of the line pattern, an arbitrary threshold is set for the gradation value. An area that indicates a higher gradation than this threshold value is considered to be the line pattern portion. A position at which the gradation value crosses the threshold value is determined as the edge of the line pattern. The length between the determined edges (the width of the line pattern) is calculated as the CD value of the line pattern.

Through the CDMAP creation unit 176, the controller device 102 generates the ΔCD value, which is the difference between the CD value calculated regarding the line pattern of the optical image and the CD value of the line pattern corresponding to the reference image, and creates the CDMAP based on the position of the line pattern thereof and the ΔCD value. The CDMAP creation unit 176 stores the generated CDMAP.

In step S307, through the comparison unit 177, the controller device 102 compares the optical image for which position has been matched in step S305 with the data of the reference image regarding each of the frames 220. The comparison unit 177 compares the optical image and the reference image of each frame, and, when the difference exceeds a preset threshold value, such portion is determined as a portion with a defect in the pattern formed on the mask 200. When determining the threshold value, for example, the CDMAP generated in step S306 is referred to. The comparison unit 177 stores the determination result on whether or not there is a defect in the external storage 164.

In step S308, the controller device 102 determines whether or not the processing has ended regarding the last frame of the optical image of the Nth stripe 21N. When it is determined that there is an unprocessed frame 220, the processing returns to step S305. In the case where the processing regarding the last frame 220 has ended, the inspection processing of the optical image of the mask 200 acquired regarding the Nth stripe 21N is ended.

In the present embodiment, information of the pattern edge detected for calculating the CD value of the pattern in the optical image of each frame in step S306 is used for evaluating the reliability of the shift amount of the optical image of each frame in correction value calculation stage S103 of the optical image acquisition position in the subsequent stage. For example, in the example of the line-and-space pattern shown in FIG. 7A, since the edge of the line pattern exists in the X-axis direction, position matching can be performed by referring to these edges as a clue. Accordingly, the accuracy of the position matching between the optical image and the reference image tends to be high, and the shift amount of the optical image obtained by the position matching can be considered highly reliable. On the other hand, since there is no edge that can be referred to as a clue for the position matching in the Y-axis direction, the position matching between the optical image and the reference image tends to become less accurate. Accordingly, the shift amount in the Y direction of the optical image obtained by the position matching between the optical image and the reference image may be considered less reliable. Accordingly, in optical image inspection stage S102, information such as the number of detected edges and patterns and the shape of patterns regarding, for example, each of the X-axis direction and the Y-axis direction that is detected in step S305 is associated with each frame and stored in the external storage 164 as an evaluation value of reliability of the shift amount of the optical image of each frame. The evaluation value is then passed on to correction value calculation stage S103 of the optical image acquisition position in the subsequent stage. In step S305, when repeating the calculation of the SSD value by superimposing the optical image and the reference image while shifting the positional relationship thereof at a predetermined width (for example, by a predetermined width in the X-axis direction, and by a predetermined width in the Y-axis direction), it may be determined from a gradient in which the calculated SSD value converges to a minimum value that, when the gradient is large, the shift amount is highly reliable, and, when the gradient is small, the shift amount less reliable. Accordingly, gradient information may also be considered as the evaluation value of the reliability of the shift amount. Therefore, the inspection apparatus 10 has a function of a shift amount determination unit that is configured to determine the shift amount between the reference image and the optical image by matching, and generate an evaluation value that indicates the reliability of the determined shift amount.

<Correction Value Calculation Stage of Optical Image Acquisition Position>

Figure 8:
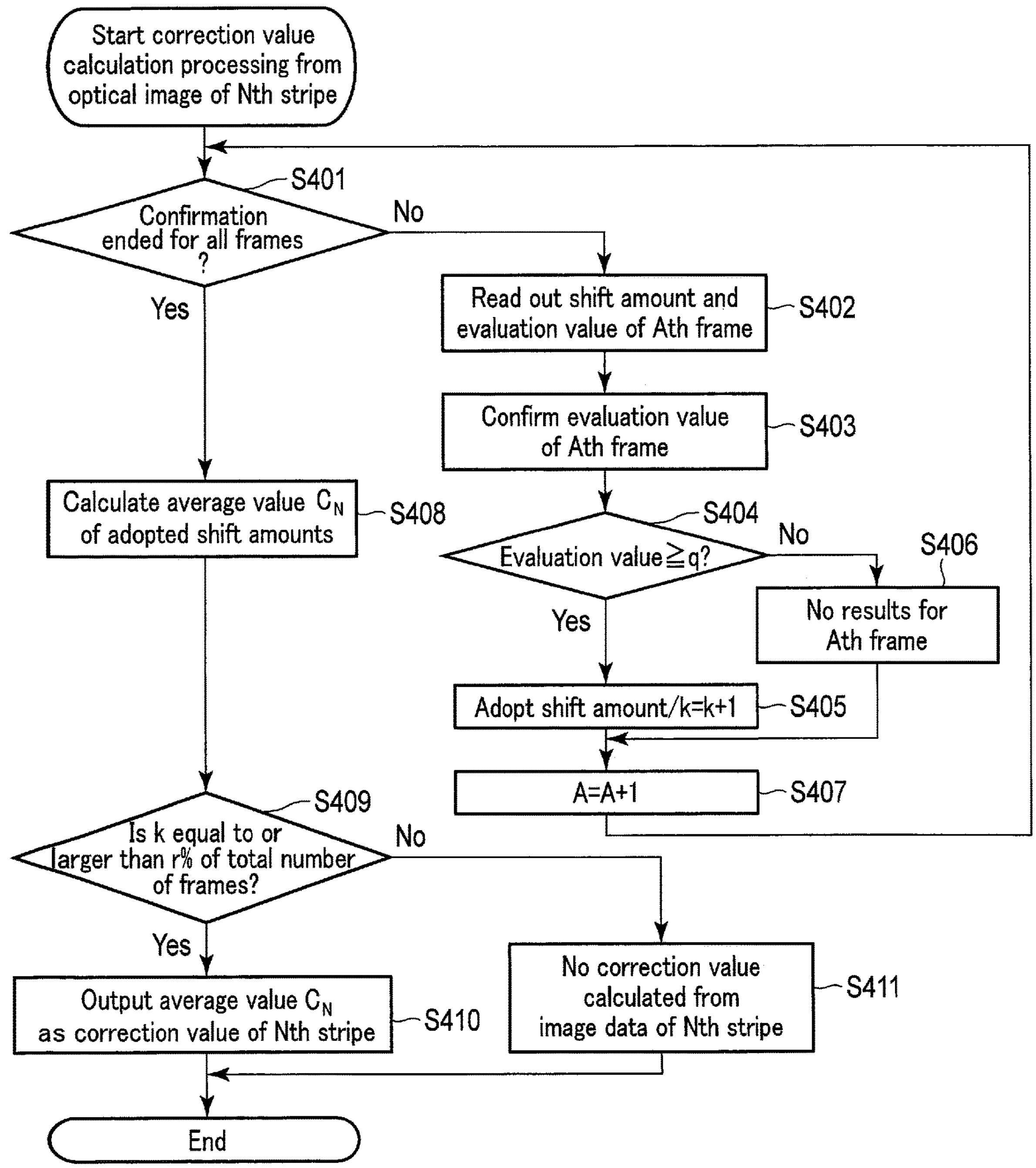
FIG. 8 is a flowchart showing a procedure for calculating a correction value from an acquired optical image in the inspection apparatus of the embodiment.

The correction value calculation processing of the optical image acquisition position of stage S103 will be explained with reference to the flowchart shown in FIG. 8. A correction value is a value that is assigned as a shift amount of the entire optical image of the mask 200 acquired regarding a certain stripe (for example, the first stripe 211). As mentioned above regarding steps S202 to S204 in FIG. 4, the correction value is used to calculate an offset value $\mathrm{OFFSET}_N$ ($\alpha_N$, $\beta_N$) to correct a start coordinate ($X_{N0}$, $Y_{NO}$) for acquiring the optical image of the mask 200 regarding the Nth stripe 21N. The correction value includes, for example, a correction value in the X-axis direction and a correction value in the Y-axis direction. FIG. 8 shows processing for calculating the correction value from the optical image of the mask 200 acquired regarding the Nth stripe 21N.

In step S401, it is determined whether or not confirmation has been made on whether or not the shift amount of the optical image has been used for all of the frames of the optical image of the Nth stripe 21N. In the case where confirmation on all of the frames has not been made, the processing proceeds to step S402.

In step S402, the correction value calculation unit 178 reads out from the external storage 164 the shift amount of the optical image and the evaluation value of the shift amount regarding the Ath frame of the Nth stripe 21N. Here, an initial value of A is "1".

In step S403, the correction value calculation unit 178 confirms the evaluation value of the Ath frame. As mentioned above, the evaluation value is a value that indicates the reliability of the shift amount of the optical image of the Ath frame. In order to calculate a highly reliable shift amount, for example, it is necessary to consider the correctness of the match between the pattern of the optical image and the pattern of the reference image indicated by the smallest SSD value. To determine whether or not the smallest SSD value indicates a correct match between the optical image and the reference image, it is preferable for the image to include a gradation value difference, which is a clue for accessing the match, that is, for example, an edge. Therefore, for the evaluation value, various values indicating the calculation reliability of the SSD value are used. As an example of the evaluation value, there is the number of edges. In the case where the number of edges is the evaluation value, the correction value calculation unit 178 utilizes the result of an edge detection that is performed when calculating the CD value in step S306. For the evaluation value, in addition to the number of edges, other values can be used, such as the number of patterns, a gradient value of when an evaluation index of a shift amount of the SSD value, etc. converges to a lowest value, a value indicating the magnitude of a gradation difference of an image, and a value indicating a pattern density included in an image.

In step S404, the correction value calculation unit 178 compares the evaluation value with a preset threshold value q. The correction value calculation unit 178 determines, for example, whether or not the number of edges is equal to or larger than the threshold value q. When the evaluation value is determined as being equal to or larger than the threshold value q, the processing proceeds to step S405.

In step S405, the correction value calculation unit 178 determines adopting the shift amount of the Ath frame of which the evaluation value has been determined as being equal to or larger than the threshold value q, and holds the shift amount of the Ath frame. Furthermore, the correction value calculation unit 178 adds "1" to a value of variable k that indicates the number of frames for which the positional shift amount is determined to be adopted. An initial value of the variable k is "0". Subsequently, the processing proceeds to S407.

In step S404, if the evaluation value is determined to be smaller than the threshold value q, the processing proceeds to step S406. In step S406, the correction value calculation unit 178 does not adopt the shift amount regarding the Ath frame and determines that there is no result of the shift amount calculation. Subsequently, the processing proceeds to S407. In the present embodiment, a less reliable shift amount of an optical image of a frame is not used when calculating the correction value. Therefore, it is also not used when calculating the offset value that determines the acquisition start position of the optical image of the subsequent stripes. Accordingly, the certainty of the offset value increases, which prevents an incorrect acquisition start position from being set.

In step 3407, the correction value calculation unit 178 adds 1 to the variable A that indicates a frame number. That is, A indicates the next frame. Subsequently, the processing returns to step S401. That is, it is determined whether or not the positional shift amount is adopted for all of the frames regarding the Nth stripe 21N. In the case where confirmation on all of the frames has not been made, the processing from step S402 is repeated for the new frame.

In step S401, when the above-mentioned confirmation processing is determined as being completed for all of the frames, the processing proceeds to step S408. In step S408, the correction value calculation unit 178 calculates an average value $C_N$ of the adopted shift amount of the frame that is being held. For the calculation of the average value $C_N$, the adopted number of frames k which is counted in step S405 is used.

In step S409, the correction value calculation unit 178 determines whether or not the number of frames k adopting the shift amount is equal to or larger than r % of the number of all of the frames. Instead of this determination, it may also be determined whether or not the adopted number of frames k is equal to or larger than a preset value. When the number of frames k adopting the shift amount is equal to or larger than r % of the number of all of the frames, the processing proceeds to step S410. If the adopted number of frames k is small, the shift amount for these frames may not necessarily be reflecting the tendencies of the shift across the entire Nth stripe 21N. That is, if the population parameter (the adopted number of frames k) is small, in the case where the shift amount of the optical image caused by, for example, a pattern defect, and not by the influence of a drift, is specifically calculated, the correction value may be easily influenced by a specific shift amount. This step S409 serves to calculate a correction value that is less influenced by such specific numeric value.

In step S410, as the correction value calculated from the optical image of the Nth stripe 21N, the correction value calculation unit 178 outputs the average value $C_N$ calculated in step S408 to a file. The file format is optional; however, the stripe number N and the correction value $C_N$ may be associated with each other and stored in, for example, a csv format. Subsequently, the processing is ended.

In step S409, when the number of frames k adopting the shift amount is smaller than r % of the number of all of the frames, the processing proceeds to step S411. In step S411, the correction value calculation unit 178 determines that there is no correction value that is calculated from the optical image of the mask 200 of the Nth stripe 21N. Subsequently, the processing is ended.

The above-mentioned calculation of the correction value regarding the Nth stripe 21N may be processing that calculates the correction value in the X-axis direction and the correction value in the Y-axis direction.

<Acquisition Processing of Optical Image Using Correction Value>

In FIG. 4, the application of the offset value OFFSET ($\alpha$, $\beta$) to the positional coordinate ($X_{NO}$, $Y_{NO}$) of when acquiring the optical image for the Nth stripe 21N is shown in a simplified manner in steps S203 and S204.

Figure 9:
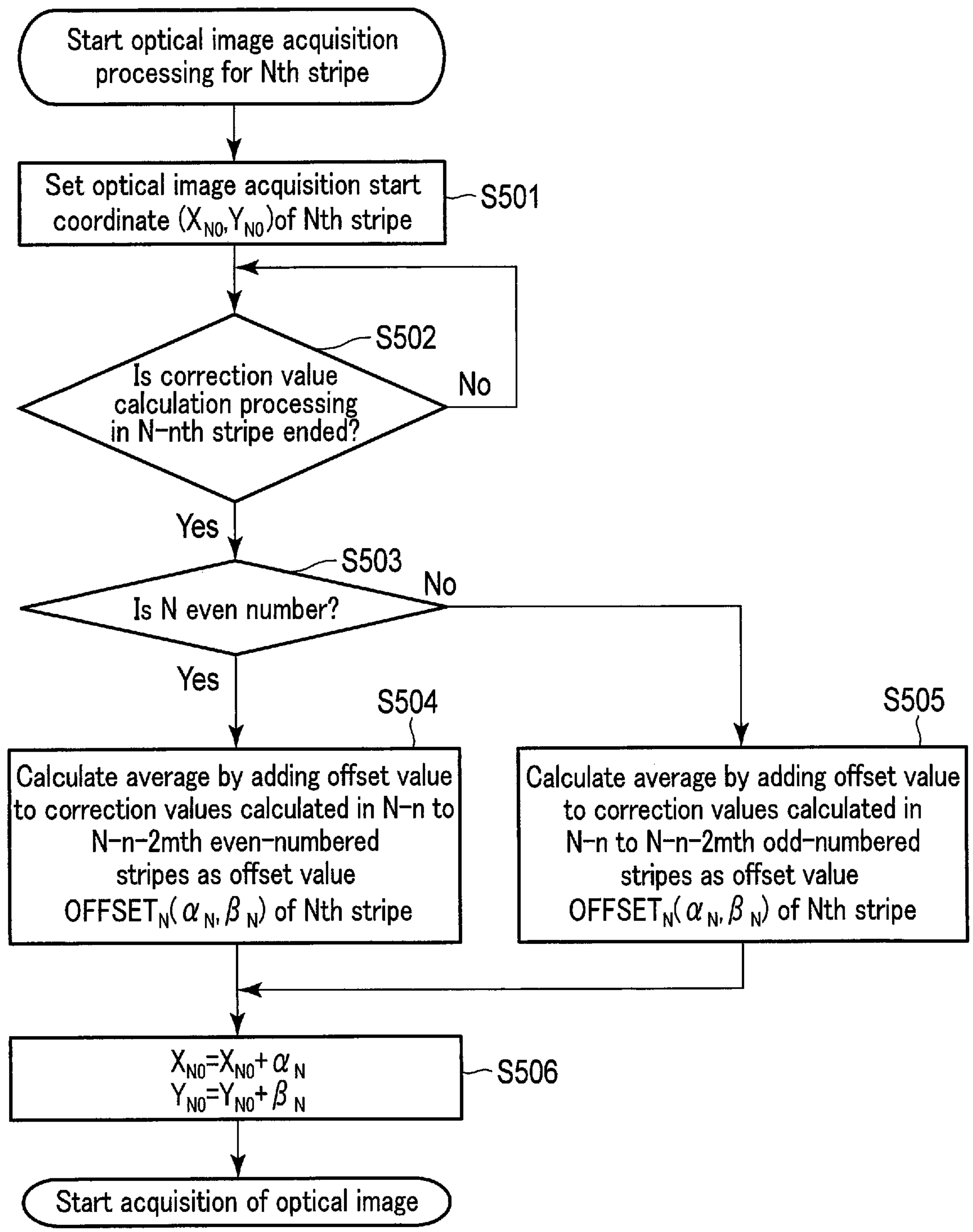
FIG. 9 is a flowchart showing a procedure for determining an offset value for correcting an acquisition start coordinate of an optical image of a mask in the inspection apparatus of the embodiment.

FIG. 9 is a flowchart showing the procedure of correcting the acquisition start coordinate ($X_{NO}$, $Y_{NO}$) of the optical image of the mask 200 by utilizing the offset value OFFSET ($\alpha$, $\beta$) regarding the Nth stripe 21N further in detail.

The processing for acquiring the optical image of the mask 200 regarding the Nth stripe 21N is started by setting the optical image acquisition start coordinate ($X_{NO}$, $Y_{NO}$) of the Nth stripe in step S501.

In step S502, it is determined whether or not the correction value calculation processing in the N−nth (n is an integer number smaller than N) stripe is ended. If not ended, step S502 is repeated until the correction value calculation processing in the N−nth stripe is ended. The determination in step S502 is made because, since the processing in stages S101 to S103 flows in a pipeline as shown in FIG. 3, a time interval is required for processing at least n stripes until the Nth stripe 21N is able to utilize the correction values calculated in the previous stripes.

In the case where the correction value calculation processing in the N−nth stripe is ended, the processing proceeds to step S503.

In step S503, the controller device 102 determines whether or not N is an even number (an odd number or an even number). This determination is made because the direction of scanning (direction of moving the table 111) in the X-axis direction of the mask 200 is opposite regarding the odd-numbered stripes and the even-numbered stripes, which brings about different tendencies in the shifting. Therefore, a more preferred correction can be made by using the correction value of the stripe scanned in the same direction in the X-axis direction.

In the case where N is an even number, in step S504, the controller device 102 calculates the offset value $OFFSET_N$ ($\alpha_N$, $\beta_N$) of the optical image acquisition start coordinate of the Nth stripe. When calculating the offset value $OFFSET_N$ ($\alpha_N$, $\beta_N$), a correction value C of an even-numbered stripe among the stripes from N−n to N−n−2m (here, m is an integer number) is used. Such aspect is schematically shown in FIG. 2. The correction value C of such stripe is calculated based on the image of such stripe, and the stripe image thereof is acquired with reference to the optical image acquisition start coordinate corrected by adding the offset value. Accordingly, the shift amount from an origin point of each stripe image is a value obtained by adding the offset value of this stripe image to the calculated correction value C. Therefore, in the present embodiment, an average value of values obtained by adding each of the offset values to each of the correction values C of the even-numbered stripes among the stripes from N−n to N−n−2m will be the offset value $OFFSET_N$ ($\alpha_N$, $\beta_N$). For example, when m is 2, an average value of a correction value $C_{N-n}$+$OFFSET_{N-n}$ ($\alpha_{N-n}$, $\beta_{N-n}$) calculated regarding the N−nth stripe, a correction value $C_{N-n-2}$+$OFFSET_{N-n-2}$ ($\alpha_{N-n-2}$, $\beta_{N-n-2}$) calculated regarding the N−n−2th stripe, and the correction value $C_{N-n-4}$+$OFFSET_{N-n-4}$ ($\alpha_{N-n-4}$, $\beta_{N-n-4}$) calculated in the N−n−4th stripe will be the offset value $OFFSET_N$($\alpha_N$, $\beta_N$). Since N changes, this average value indicates, in other words, a moving average value. For example, when N=n+4, since the N−n−4th stripe does not exist, processing is performed in a manner that the average value of the correction value $C_4$+$OFFSET_4$ ($\alpha_4$, $\beta_4$) of an existing N−nth (fourth) stripe and the correction value $C_2$+$OFFSET_2$ ($\alpha_2$, $\beta_2$) of the N−n−2th (second) stripe becomes the offset value $OFFSET_N$. In this manner, the average value of the correction value C regarding stripes in the same direction as the moving direction of the table 111 is set as the offset value $OFFSET_N$. Subsequently, the processing proceeds to S506.

In step S505, when N is determined as an odd number, the processing proceeds to step S505. In step S505, as the offset value $OFFSET_N$ ($\alpha_N$, $\beta_N$) of the Nth stripe, the controller device 102 calculates an average value of values obtained by adding each of the offset values to each of the correction values C of the odd-numbered stripes among the stripes from N−n to N−n−2m (here, m is an integer number). Subsequently, the processing proceeds to S506.

In step S506, the controller device 102 corrects the acquisition start coordinate ($X_{NO}$, $Y_{NO}$) of the optical image by using the calculated offset value $OFFSET_N$ ($\alpha_N$, $\beta_N$) regarding the Nth stripe 21N.

The controller device 102 acquires from the corrected coordinate optical images of the mask 200 yet to be acquired.

As explained in step S411 of FIG. 8, there are also stripes that are considered to have no correction values to be calculated. As a result, it is possible to avoid using less reliable correction values of stripes for calculating the offset value $OFFSET_N$ ($\alpha_N$, $\beta_N$) of the Nth stripe. Therefore, the inspection apparatus 10 functions as an offset value calculation unit which, when generating the offset value for adjusting the acquisition position of the optical image, determines whether or not to use the determined shift amount based on the evaluation value, and calculates the offset value based on the shift amount that is determined to be used.

In the present embodiment, it is determined whether or not to use the positional shift amount as the correction value for each frame based on, for example, the evaluation value such as the number of edges.

For example, in the case where the calculated shift amount is less reliable due to no pattern edges existing in the frame, or having small number of pattern edges, the error of the coordinate may rather increase by using the shift amount of such frame as the correction value.

In contrast, in the present embodiment, there is no possibility of a less reliable shift amount being used for the setting of the offset value of the acquisition start coordinate of the optical image. Furthermore, when determining the shift amount of the stripe, in the case where the number of frames that can be utilized for determining the shift amount is small, the shift amount to be determined is determined as being less reliable, and the shift amount of such stripe would not be used to calculate the correction value. Therefore, since an appropriate offset value would be applied to the acquisition start coordinate of the optical image, the mask 200 would be positioned appropriately, thereby, realizing fast and highly accurate inspection. The offset value determining method according to the present embodiment effectively prevents pitch shifts, especially in the case where miniaturization of the pattern progresses, and the pitch becomes smaller. In a mask having a pattern with lines, in particular, formed diagonally, pitch shifts become a major problem. Therefore, the technique according to the present embodiment will be effective.

In the embodiment mentioned above, depending on whether the evaluation value is equal to or larger, or lower than the preset threshold value, it is alternatively decided on whether or not the correction value would be used for the positional shift amount. However, the present invention is not limited to this. For example, the positional shift amount may be weighted in accordance with the evaluation value. Similarly, although whether or not to adopt the correction value is selected in accordance with the number of frames k for which the positional shift amount is adopted, the correction value may also be weighted in accordance with the number of frames k for which the positional shift amount is adopted. In this manner, in the present invention, in the case where the evaluation value is high, the calculated positional shift amount is strongly reflected in the offset value, and, in the case where the evaluation value is low, the calculated positional shift amount is not so much reflected in the offset value.

In the above embodiment, an example of an inspection system for inspecting a mask used for a lithography method, etc. has been explained. However, the technique of the present embodiment may be applied in other ranges as well. For example, the present technique may also be used for an inspection system in which a wafer is the inspection target.

The present invention is not limited to the embodiments described above, and various modifications may be implemented without departing from the concept or scope of the present invention.

In the embodiments described above, descriptions for portions which are not directly necessary to explain the present invention, such as detailed configurations of devices and control methods, are omitted. However, it should be noted that the configurations of the devices and the control methods can be suitably selected and used if required. All inspection methods and inspection apparatuses that comprise the elements of the present invention and that can be suitably modified by a person ordinarily skilled in the art are encompassed in the scope of the present invention.

What is claimed is:

1. An inspection apparatus comprising:

an optical image acquisition circuitry configured to virtually divide a sample into a plurality of strip-shaped stripes along a first direction, and acquire an optical image for each of the stripes;

a reference image generation circuitry configured to generate a reference image corresponding to the optical image;

a comparison circuitry configured to compare the optical image and the reference image corresponding to the optical image;

a shift amount determination circuitry configured to determine a shift amount between the optical image and the reference image corresponding to the optical image by matching them, and generate an evaluation value indicating reliability of the shift amount; and an offset value calculation circuitry configured to determine whether or not to use the shift amount based on the evaluation value, and, in a case where the shift amount is determined to be used, calculate an offset value for adjusting an acquisition position of the optical image of the stripe based on the shift amount, wherein, in a case where the offset value is calculated, the optical image acquisition circuitry is configured to acquire the optical image based on the offset value.

2. The apparatus according to claim 1, wherein the shift amount determination circuitry is configured to generate the evaluation value based on a characteristic of a pattern of the sample specified based on the optical image, or the matching.

3. The apparatus according to claim 1, wherein the shift amount determination circuitry is configured to determine, regarding each frame obtained by dividing each of the plurality of stripes into a plurality of frames, the shift amount of the optical image of the frame by matching the optical image and the reference image, and generate the evaluation value with respect to the shift amount of the optical image of the frame, and the offset value calculation circuitry is configured to:

determine, regarding each of the plurality of frames, whether or not to use the shift amount of the optical image of the frame when determining the shift amount of the optical image of the entire stripe based on the evaluation value;

determine the shift amount of the optical image of the entire stripe by averaging the shift amounts of the optical images of the frames determined to be used; and calculate the offset value based on the shift amount of the optical image of the entire stripe.

4. The apparatus according to claim 3, wherein, in a case where a number of frames or a rate of the frames that can be used for calculating the shift amount of the optical image of the entire stripe is equal to or larger than a preset value, the offset value calculation circuitry is configured to determine the shift amount of the optical image of the entire stripe.

5. The apparatus according to claim 3, wherein the offset value calculation circuitry is configured to generate the offset value by averaging at least two values obtained by adding the offset value used when acquiring the optical image of the stripe to the shift amount of the optical image of the entire stripe determined with respect to each of the plurality of stripes.

6. The apparatus according to claim 3, wherein the offset value calculation circuitry is configured to output an average value of the shift amounts of the frames that are determined to be used.

7. The apparatus according to claim 3, wherein the shift amount determination circuitry is configured to move the optical image in the first direction and a second direction that intersects the first direction until the optical image and the reference image match, and determine a moved distance as the shift amount.

8. The apparatus according to claim 1, wherein the optical image acquisition circuitry is configured to acquire the optical images of the plurality of stripes alternately in a forward direction and a reverse direction, and the offset value calculation circuitry is configured to:

determine the offset value for the optical image of the stripe acquired in the forward direction based on the shift amount of the optical image determined regarding the stripe in which the optical image is acquired in the forward direction; and determine the offset value for the optical image of the stripe acquired in the reverse direction based on the shift amount of the optical image determined regarding the stripe in which the optical image is acquired in the reverse direction.

9. The apparatus according to claim 1, wherein the optical image acquisition circuitry is configured to acquire the optical images of the plurality of stripes alternately in a forward direction and a reverse direction, the plurality of stripes including a first stripe in which the optical image is acquired in the forward direction, a second stripe in which the optical image is acquired in the reverse direction after the optical image of the first stripe is acquired, a third stripe in which the optical image is acquired in the forward direction after the optical image of the second stripe is acquired, and a fourth stripe in which the optical image is acquired in the reverse direction after the optical image of the third stripe is acquired, and the shift amount determination circuitry is configured to use the shift amount of the optical image of the first stripe for the matching of the third stripe, and use the shift amount of the optical image of the second stripe for the matching of the fourth stripe.

10. The apparatus according to claim 9, wherein the optical image of the third stripe is acquired after the offset value of the third stripe based on the shift amount of the optical image of the first stripe is calculated, and the optical image of the fourth stripe is acquired after the offset value of the fourth stripe based on the shift amount of the optical image of the second stripe is calculated.

11. The apparatus according to claim 10, wherein the acquisition position of the optical image of the third stripe is adjusted based on the offset value of the first stripe, and the acquisition position of the optical image of the fourth stripe is adjusted based on the offset value of the second stripe.

12. The apparatus according to claim 1, wherein the shift amount determination circuitry is configured to generate the evaluation value by using at least one of a sum of squared difference (SSD) value of the shift amount, a sum of absolute difference (SAD) value of the shift amount, and a normalized cross-correlation (NCC) value of the shift amount.

13. An inspection method comprising:

acquiring an optical image for each of a plurality of strip-shaped stripes by virtually dividing a sample into the plurality of stripes along a first direction, and;

generating a reference image corresponding to the optical image;

comparing the optical image and the reference image corresponding to the optical image;

determining a shift amount between the optical image and the reference image corresponding to the optical image by matching them;

generating an evaluation value indicating reliability of the shift amount; and calculating an offset value for adjusting an acquisition position of the optical image of the stripe based on the shift amount, in a case where the shift amount is determined to be used based on the evaluation value, wherein, in a case where the offset value is calculated, the acquiring the optical image acquires the optical image based on the offset value.

14. The method according to claim 13, wherein the evaluation value is generated based on a characteristic of a pattern of the sample specified based on the optical image, or the matching.

15. The method according to claim 13, wherein the determining the shift amount determines, regarding each frame obtained by dividing each of the plurality of stripes into a plurality of frames, the shift amount of the optical image of the frame by matching the optical image and the reference image, the generating the evaluation value includes averaging the shift amounts of the frames determined to be used, and the calculating the offset value includes:

determining, regarding each of the plurality of frames, whether or not to use the shift amount of the optical image of each frame when determining the shift amount of the optical image of the entire stripe based on the evaluation value;

determining the shift amount of the optical image of the entire stripe by averaging the shift amounts of the optical images of the frames determined to be used; and calculating the offset value based on the shift amount of the optical image of the entire stripe.

16. The method according to claim 15, wherein, in a case where a number of frames or a rate of the frames determined be used for calculating the shift amount of the optical image of the entire stripe is equal to larger than a preset value, the calculating the offset value determine the shift amount of the optical image of the entire stripe.

17. The method according to claim 15, wherein the calculating the offset value calculates the offset value by averaging at least two values obtained by adding the offset value used when acquiring the optical image of the stripe to the shift amount of the optical image of the entire stripe determined with respect to the stripe.

18. The method according to claim 15, wherein the acquiring the optical image acquires the optical images of the plurality of stripes alternately in a forward direction and a reverse direction, and the calculating the offset value includes:

determining the offset value for the optical image of the stripe acquired in the forward direction based on the shift amount of the optical image determined regarding the stripe in which the optical image is acquired in the forward direction; and determining the offset value for the optical image of the stripe acquired in the reverse direction based on the shift amount of the optical image determined regarding the stripe in which the optical image is acquired in the reverse direction.

* * * * *